United States Patent [19]

Ordogh et al.

[11] Patent Number: 5,445,478
[45] Date of Patent: Aug. 29, 1995

[54] HAND-HELD APPARATUS FOR MACHINING OF CYLINDER HEAD VALVE GUIDE HOLES

[75] Inventors: Joseph Ordogh; Frank Ordogh, both of Thornhill, Canada

[73] Assignee: Parts Manufacturing Co. Ltd., Concord, Canada

[21] Appl. No.: 225,992

[22] Filed: Apr. 12, 1994

[51] Int. Cl.⁶ .................... B23B 35/00; B23B 41/12
[52] U.S. Cl. .................... 408/1 R; 408/83.5; 408/95
[58] Field of Search .............. 408/1 R, 79, 82, 83.5, 408/95, 110, 111, 130, 712

[56] References Cited

U.S. PATENT DOCUMENTS

| | | |
|---|---|---|
| 3,157,068 | 11/1964 | Rickert ......................... 77/2 |
| 3,333,487 | 8/1967 | Parry ........................... 77/4 |
| 3,764,204 | 10/1973 | Kammeraad ................... 408/75 |
| 4,147,462 | 4/1979 | Appleby et al. ............... 408/83.5 |
| 4,545,706 | 10/1985 | Hiroyasu et al. ............. 408/83.5 |
| 5,281,057 | 1/1994 | Ritt ............................ 408/75 |

OTHER PUBLICATIONS

"Rapid Crankshaft Repair Sleeves Phosphor–Bronze Valve Guide Sleeves," brochure from Parts Manufacturing Company, Ltd., pp. 6 and 7.

*Primary Examiner*—Daniel W. Howell
*Attorney, Agent, or Firm*—Hodgson, Russ, Andrews, Woods & Goodyear

[57] ABSTRACT

A cradle for a hand-held tool for machining of cylinder head valve guide holes. The tooling has a pilot portion. A collar has a passage for the tooling and is shaped to engage a least worn portion of a valve seat associated with the valve guide hole around the circumference thereof without engaging more worn portions of the valve seat. The cradle comprises a bracket which has a passage for the tooling without passage of the collar so that the bracket can bear on the collar. Force is applied to the bracket to hold the collar in engagement with the valve seat.

20 Claims, 3 Drawing Sheets

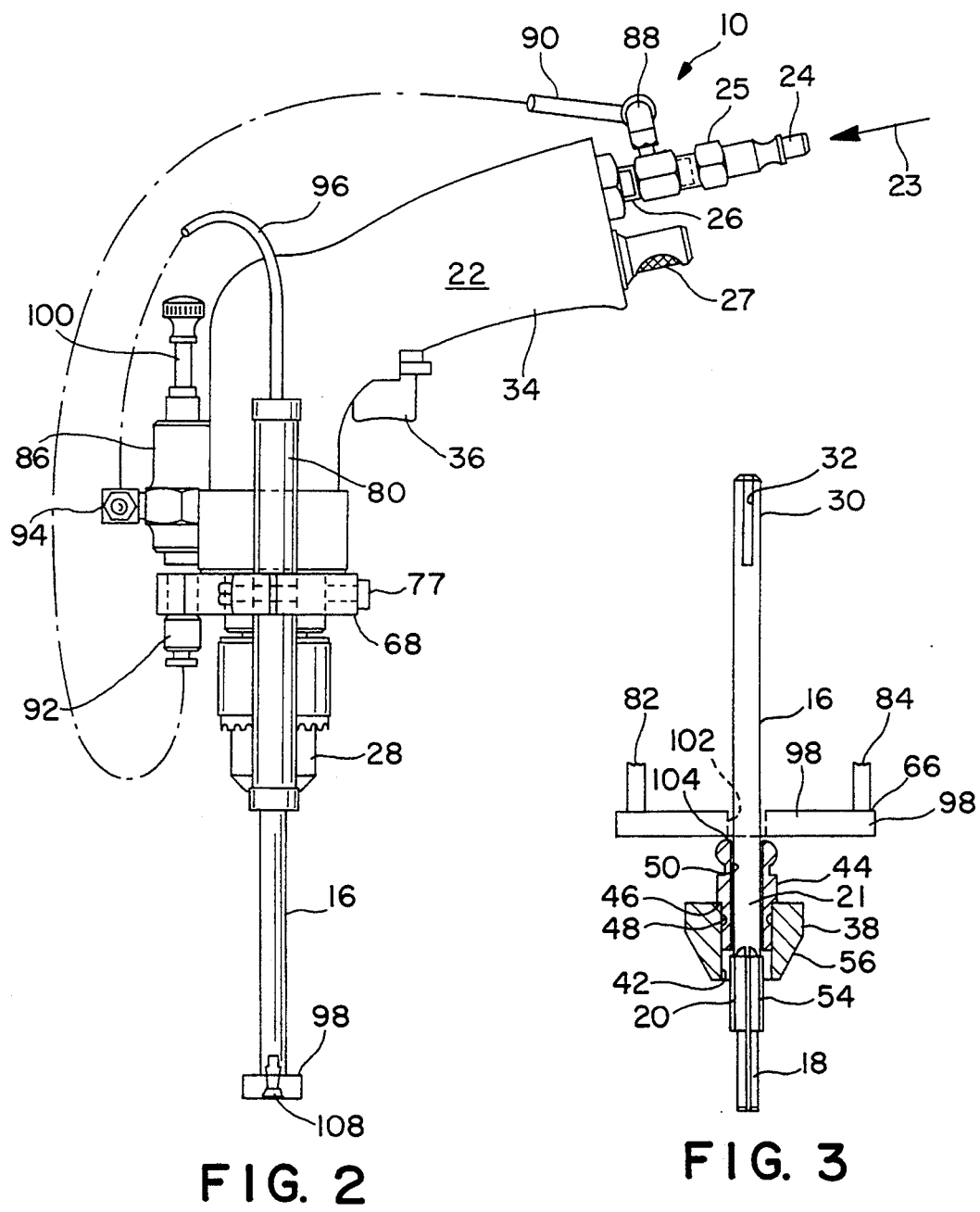

HAND-HELD APPARATUS FOR MACHINING OF CYLINDER HEAD VALVE GUIDE HOLES

The present invention relates generally to the machining of valve guide holes on engine cylinder heads.

There has developed in the rapidly growing engine rebuilding industry a need for better, faster, and cheaper manufacturing processes for reconditioning worn-out engine blocks and components.

One area of engine head reconditioning involves restoring worn-out valve guide holes. This involves enlarging the old hole to a precise larger diameter and pressure installing a specially sized bronze sleeve into the hole to restore the required tight clearance between a new or reground valve stem and the hole wall. The soundness of this process is highly dependent on the remachined hole quality, its size, position, and alignment.

As seen in FIG. 3 of U.S. Pat. No. 3,764,204 to Kammeraad, the disclosure of which is hereby incorporated herein by reference, boring or reaming of the valve guide hole requires passage of the tooling through the space bounded by the valve seat then into the hole. The irregular shape of the structure surrounding the valve seat results in difficulties in mounting boring or reaming apparatus to achieve the necessary alignment of such tooling relative to the hole.

Kammeraad discloses a U-shaped valve guide boring fixture having a support post on which are mounted two guide arms. One guide arm engages the spring seat on the lower side of the cylinder head. The other guide arm has an adaptor which has a beveled or radius edge which rests on a portion of the valve seat which has the smallest diameter or circumference, which is the unworn or least worn portion of the valve seat. Since valve seats wear unevenly and non-uniformly, the resting of the adaptor on a worn portion of the valve seat would be expected to produce an inaccurate alignment and thus an inaccurate reboring. Reworking tooling is passed through a bore in the adaptor. A ball swivel guide, which has a passage for tooling to the adaptor passage, pivots relative to the guide arm to effect alignment of the tooling passages with the valve guide hole. Once alignment is achieved, the fixture is then tightened in the aligned position.

In a reaming fixture marketed by Parts Manufacturing, Ltd. of Concord, Ontario, the assignee of the present invention, under its model no. RF1000, the cylinder head is mounted on head stands, and alignment to the valve seat is achieved by mechanically locking down a seat collar and reamer bushing, and the pilot portion of the reamer acts in concert therewith for reamer alignment. Such a fixture undesirably requires repositioning of the clamping rod for each valve guide hole to be reamed, a time-consuming task. A machining process has also been controlled by a permanent jig fixture which locks a hand-held tool such as a drill into a fixed position. Undesirably, the jig has to be re-set for each new operation or hole to be drilled.

Other devices for reconditioning valve guides are shown in U.S. Pat. Nos. 3,157,068 to Rickerr and 3,333,487 to Parry.

None of the above devices are of a hand-held type which allows reamer/valve guide hole alignment to be achieved quickly and easily without set-up and clamping fixtures (jigs) and the like.

It is accordingly an object of the present invention to achieve, and maintain during machining, the necessary alignment easily and quickly of tooling for valve guide hole machining to enable an operator to process more cylinder heads in a shorter period of time.

It is another object of the present invention to provide apparatus for valve guide hole machining which is compact and hand-held.

It is a further object of the present invention to have the capability in the apparatus of rapid tooling interchangeability from one size of tooling to another.

It is yet another object of the present invention to allow the machining feed rates of the apparatus to be increased and decreased as desired by the operator.

It is a still further object of the present invention to provide rapid advancement to the next valve guide hole with no indexing required.

It is another object of the present invention to reduce costly pre-machining preparations for machining a valve guide hole.

It is another object of the present invention to eliminate set-up and clamping fixtures for machining a valve guide hole.

It is yet another object of the present invention to provide apparatus for use in remote shops, which may be less mechanized, for machining valve guide holes.

In accordance with the present invention, hand-held apparatus for machining of valve guide holes is provided wherein the tooling pilot portion and a collar, which engages a least worn portion of the associated valve seat, are used to achieve and maintain the necessary alignment during the machining process. The collar is held in engagement with the valve seat by a bracket which bears on a tooling bushing on which the collar is held or otherwise on the collar. In order to achieve and maintain positive engagement of the collar with the valve seat, force is applied to the collar to force it downwardly to the valve seat by a pair of cylinders connected thereto on opposite sides of an aperture in the bracket through which the tooling passes, the force moments applied to the bracket by the cylinders being equalized to prevent side forces from interfering with alignment and with handling of the apparatus.

The above and other objects, features, and advantages of the present invention will be apparent in the following detailed description of the preferred embodiment thereof taken in conjunction with the accompanying drawings wherein the same reference numerals denote the same or similar parts throughout the several views.

BRIEF DESCRIPTION OF THE DRAWINGS

FIG. 2 is partial side view thereof.

FIG. 3 is a side view of tooling therefor.

DETAILED DESCRIPTION OF THE PREFERRED EMBODIMENT

Figure 4:
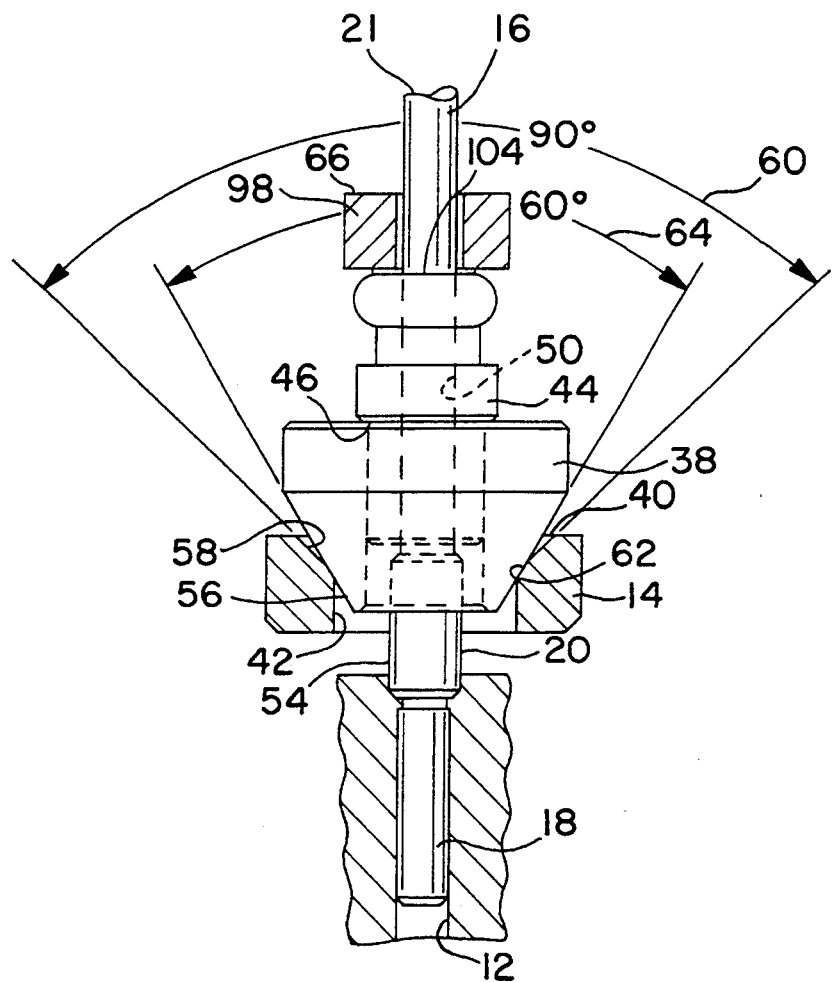
FIG. 4 is a partial view of tooling therefor illustrating alignment of the tooling.

Referring to the drawings, there is shown at 10 a hand-held apparatus for re-machining, such as by boring or reaming, of worn-out valve guide holes, illustrated at 12 in FIG. 4, in an engine cylinder head 14. An elongate reamer or bit is illustrated at 16 for re-machining the holes 12 to a larger size for installation of sleeves to restore the required tight clearance between the hole wall and a new or reground valve stem. The tooling 16 has a leading end portion called a "pilot" portion 18, a reaming portion 20, and a shank 21. The pilot portion 18 and the shank 21 each has a diameter which is less than the diameter of the reaming portion 20 and which is equal substantially to the diameter of the valve stem for the hole 12, the pilot portion 18 holding the lower end of the tooling 16 on the center line of the hole 12. The reaming portion 20 may, for example, have a diameter which is perhaps about 0.03 inch greater than that of the pilot portion 18.

The apparatus 10 includes a conventional hand-held shop air-powered air tool 22 which has air supply line 24 providing an air supply as illustrated at 23, air inlet 26, and exhaust 27. Air tool 22 may, for example, be model 1454HP Sioux drill marketed by Sioux Tools, Inc, of Sioux City, Iowa. This drill has about 80 horsepower and has a speed of about 2600 RPM, which allows the operator to achieve greater feed rates than achievable with other drills having lesser speeds. It should be understood, however, that the present invention is not limited to the tool 22 being air-powered. For example, tool 22 may be electrically powered. As used herein and in the claims, the term "tool" refers to apparatus providing power, and the term "tooling" refers to a cutting member or reamer or bit insertable in the "tool."

The tool includes a chuck 28 for receiving the terminal end portion 30 of reamer shank 21 whereby the reamer 16 may be changed quickly and easily to obtain a different reamer size. An elongate slot 32 is provided to extend axially in the end portion 30 to cooperate with the chuck 28 to prevent rotary slippage of the reamer 16 during operation of the tool 22. By holding the tool butt 34 in one's hand and pressing the trigger 36, air pressure is supplied for effecting rotary motion of the reaming tool 16, in accordance with principles commonly known to those of ordinary skill in the art to which this invention pertains, for reaming the valve guide hole 12 to a suitable larger diameter. Because the tool 22 is of a conventional type, it will not be described in greater detail herein.

The soundness of the machining process is highly dependent on the remachined hole quality, its size, position, and alignment. In order to maintain the original hole center position and alignment, a generally cylindrical collar 38 is provided to engage the associated valve seat, illustrated at 40, to, in combination with the pilot portion 18, hold the reaming tooling 16 on the center line of the hole 12.

A passage, illustrated at 42, extends axially through the collar 38 for receiving the shank 21 of the reaming tooling 16. A bushing 44 is slidably received on the reamer shank 21, the inner diameter of the reamer bushing being perhaps about .0005 inch greater than the shank diameter. The collar 38 is mounted on the bushing 44 to engage a shoulder 46 on the bushing 44 to prevent relative upward movement thereof along the bushing. The collar 38 is held onto the bushing 44 so that it does not slide off the reamer 16 of its own weight by an O-ring 48 which is receive in a circumferential groove in the outer surface of the bushing 44 and which tightly engages the passage wall of the collar so that the collar can be quickly and easily replaced. The collar 38 may be composed, for example, of case-hardened 1010 steel, and the bushing 44 may be composed, for example, of stress-proof steel. Both the collar 38 an the bushing 44 may, for example, have a Rockwell hardness of 55 to 57. In this specification and the claims, the collar 38 is meant to include the bushing 44, unless otherwise specified.

The collar 38 has a beveled lower portion providing a beveled surface or edge 56 to rest on the valve seat 40. However, the upper or outwardly portion, illustrated at 58, of the valve seat 40 may be severely worn, producing inaccurate alignment if the collar 38 were to rest thereon. The upper portion 58 of the valve seat may, for example, be worn to form an included angle, illustrated at 60, with itself of perhaps about 90 degrees. The inner portion 62 of the valve seat 40 may have a smaller included angle with itself of perhaps about 60 degrees. If the collar 38 rests on the worn portion 58 of the valve seat 40, it may produce an inaccurate alignment and thus an inaccurate reboring, since valve seats wear unevenly and non-uniformly. In order to achieve accurate alignment of the collar 38 on the valve seat 40 for accurate alignment of the tooling 16, the beveled surface 56 has an included angle, illustrated at 64, which is less than angle 60 and which preferably corresponds to the angle of a new or unworn portion, i.e., portion 62 of the valve seat 40. Angle 64 may thus perhaps be about 60 degrees. Thus, the collar beveled surface 56 is formed to engage the unworn or the least worn portion of the valve seat 40 around the circumference thereof for accurate alignment thereon.

In order to achieve accurate alignment of the tooling 16 with the center line of the valve guide hole 12, the collar 38 must be pressed down firmly into engagement with the valve seat 40. This may be accomplished by the operator by use of arm muscles, but this is tiring and may result in alignment inaccuracies. In order to achieve firm engagement of the collar 38 with the valve seat 40 without requiring the operator to expend the energy which would be required to do so manually and so as to achieve accurate alignment, in accordance with the present invention, a cradle 66 is provided to apply the required force.

Figure 1:
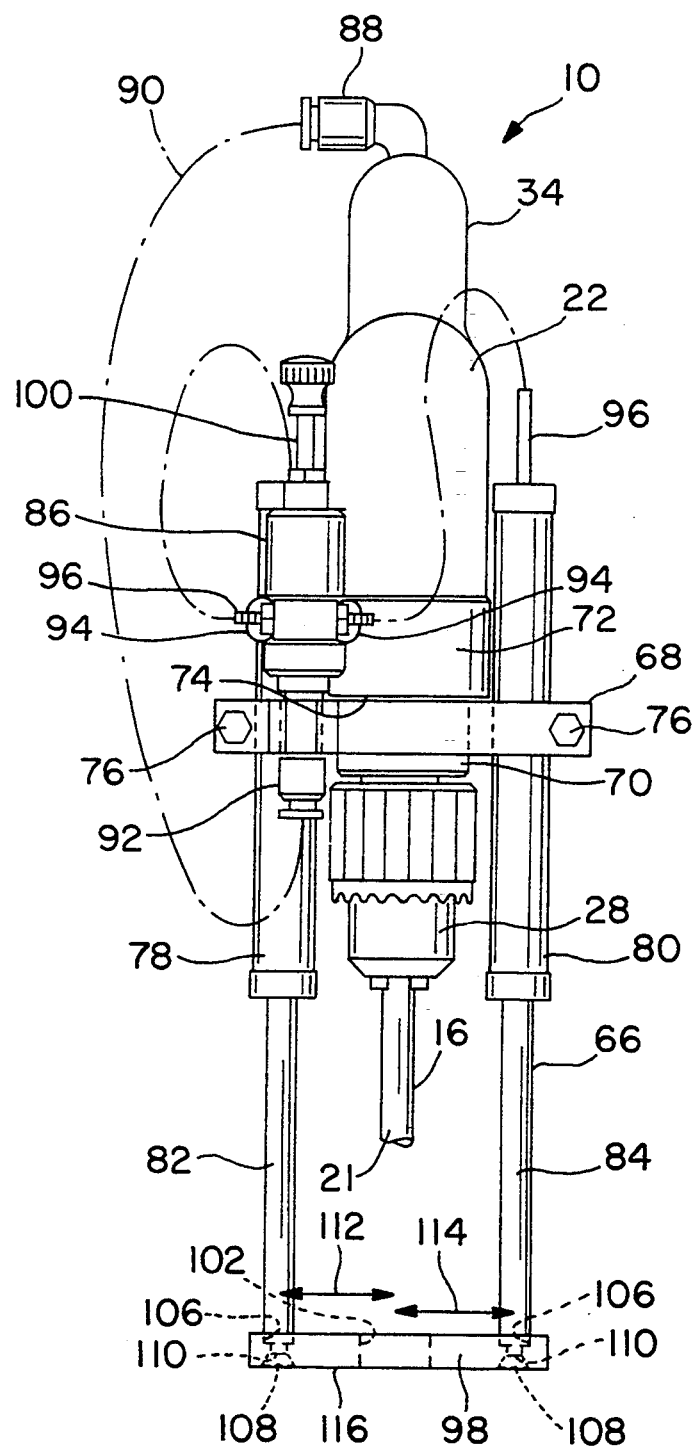
FIG. 1 is a partial plan view of apparatus, including a hand-held tool and a cradle therefor, which embodies the present invention.
Figure 5:
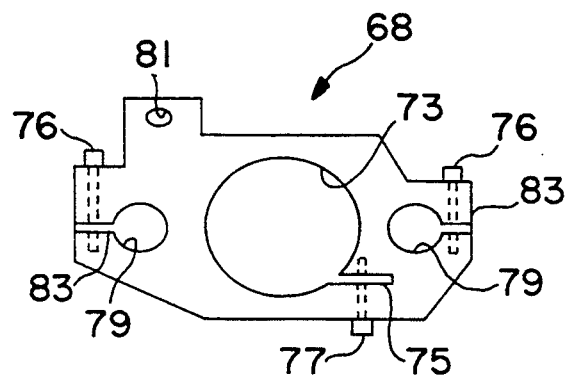
FIG. 5 is a plan view of a bracket for attaching the cradle to the hand-held tool.

Referring to FIGS. 1 and 5, a single-piece mounting bracket 68, which may be composed, for example, of aluminum having a thickness of ½ inch, is clamped onto a concentric reduced-diameter portion 70 of the body 72 of the air-tool 22 which is behind (above) the chuck 28. A generally central aperture, illustrated at 73, in clamp 68 receives tool portion 70. A slot 75 extends outwardly from aperture 73 to allow the diameter thereof to be varied so that the clamp 68 may be slipped over tool portion 70 then secured thereon by stabilizing screw 77 which is provided to close the slot thereby tightening and stabilizing the clamp 68 on tool portion 70. The bracket is clamped to engage a shoulder 74 formed by the reduced-diameter portion 70 so that the bracket 68 is positively prevented from sliding upwardly along the body of the tool.

The mounting bracket 68 in turn mounts a pair of piston-type air cylinders 78 and 80 within respective apertures, illustrated at 79, and further mounts a needle valve 86 in an aperture, illustrated at 81. A slot 83 extends outwardly from each aperture 79 to a corresponding edge of the clamp 68 to allow the diameter thereof to be varied so that the apertures 79 may receive the cylinders 78 and 80 respectively then the cylinders secured in the apertures by stabilizing screws 76 respectively which are provided to close the slots 83. This allows the cylinder stroke length to be adjusted by moving the cylinders axially within apertures 79.

The needle valve 86 is supplied with air pressure via air line 24, a fitting 88 which may be a 90 degree elbow and which branches from line 24, an air tube 90 (shown largely as a phantom line) one end of which is connected to fitting 88, and a fitting 92 to which the other end of air tube 90 connects.

The needle valve 86 has a pair of "tee" fittings 94 to which ends of air tubes 96 (shown largely in phantom lines) are attached, and the other ends of air tubes 96 are connected to the cylinders 78 and 80 for channeling of air pressure thereto for operation thereof.

The air cylinders 78 and 80 have piston rods 82 and 84 respectively. The cylinder inner diameter may perhaps be about 9/16 inch, and the cylinder rod diameter may perhaps be about 5/16 inch. When the air pressure is on and before insertion of tooling, the air cylinders 78 and 80 are fully extended. The two cylinder rods 82 and 84 are connected at their ends to a bracket 98 to integrate the actions of the cylinders 78 and 80 so that they act as a single unit. The bracket 98 may, for example, have a length of perhaps about 3 inches, a width of perhaps about ¾ inch, and a thickness of perhaps about ⅜ inch to accommodate the power drill 22. The ends of the rods 82 and 84 are received in cavities, illustrated at 106, in one side of bracket 98 and are attached thereto by screws 108 received in countersunk apertures, illustrated at 110, in the other side 116 of the bracket 98 or by other suitable means. The distance between center lines of the cylinder rods 82 and 84 may perhaps be about 2½ inches.

The needle valve 86 is a metering device wherein a portion of the inlet air is released to atmosphere through a variable cross-section orifice (not shown). The rate of air escape is controlled by an adjusting screw 100. The remaining air is channeled into the air cylinders 78 and 80 via the air tubes 96.

The bracket 98 has an aperture, illustrated at 102, through which the tooling 16 passes. The cylinder rods 82 and 84 are attached to the bracket 98 to be equally distant from the center of aperture 102, i.e., distance 112 is equal to distance 114. In other words, the cylinder rods 82 and 84 are equally distant from aperture 102 or from the tooling.

When a force is applied to the lower surface 116 of the bracket 98, it will cause the cylinder rods 82 and 84 to retract, and the air bleeding through the needle valve 86 increases. If constant force is applied, the cylinder rod retraction rate will be constant also.

During the machining process, the rod connecting bracket 98 is in contact with the collar 38 (i.e., bushing 44). The force exerted by the cylinders 78 and 80, as adjusted by operation of needle value 86, acts to press the collar 38 in engagement against the 60 degree "unspoiled" valve seat portion 62. This force is adjustable by the operation of needle valve 86 to achieve a good valve seat engagement.

The attachment of the cylinder rods 82 and 84 to the bracket 98 achieves the exertion of equal forces by the cylinders 78 and 80. Since these forces act at equal distances from the center of the tooling 16, the moments on the opposite sides of the tooling will be equalized so that the collar 38 is suitably retained in alignment in the valve seat 40 without the development of side forces which may interfere with alignment accuracy and make handling of the drill difficult.

The collar 38, which may have different sizes for different size valves, may be easily changeable by pulling it off of its seat on the bushing 44. The tooling 16, which may have different sizes for different size valve guide holes, may also be easily changed by operation of chuck 28. The machining feed rate may be varied as desired by the operator with the high speed of the drill allowing a faster feed rate to be achieved more easily than with slower speed drills.

When the operator places the reamer tooling 16 into the valve guide hole 12 to commence reaming, the reamer pilot 18 automatically finds the center of the valve guide recess 12 which in turn allows the collar 38 to properly locate the correct seating (unworn seat portion 62) within the valve seat 40 for alignment of the tooling 16 according to original specifications. The same tooling and set-up may work equally well for cast iron and aluminum cylinder heads. The cross-bar 98 of the cradle 66, which keeps the air cylinders 78 and 80 separated, will now be resting on the reamer bushing 44 and, upon activation of the drill, pressure is applied to the whole unit using the flat upper surface 104 of the reamer bushing 44 as the counter-pressure point. As pressure is applied by the operator, the air operated piston-like cylinders 78 and 80 allow the tools (reamer pilot and valve seat collar) to retain accuracy in the re-seating and reaming process without variance. By operating the adjusting screw 100, the operator may adjust the air pressure within the piston-like cylinders 78 and 80 to the operator's own preference for operation of the tool 22.

The portable cradle 66 allows the operator to quickly repeat the machining process without resetting the cradle while maintaining the desired alignment accuracy. Hole alignment may be instantly obtained and maintained with a minimum of costly pre-machining preparations and with Set-up and clamping fixtures eliminated. The set-up time may thus be said to be virtually eliminated. This enables the operator to process more cylinder heads in a shorter period of time.

While the invention has been described in detail herein, it should be understood that the present invention can be embodied otherwise without departing from the principles thereof, and such other embodiments are meant to come within the scope of the present invention as defined by the appended claims.

We claim:

1. A cradle for a hand-held tool for machining of cylinder head valve guide holes wherein the tool includes tooling having a pilot portion and a collar means having a tooling passage and which is shaped to engage a least worn portion of a valve seat associated with the valve guide hole around the circumference thereof without engaging more worn portions of the valve seat, the cradle comprising a bracket having aperture means sized for passage of the tooling without passage of the collar means so that the bracket may bear on the collar means, means for applying force to said bracket to hold the collar means in engagement with the valve seat, and means for mounting the cradle to the tool.

2. A cradle according to claim 1 wherein said force applying means comprises at least two cylinder means connected to said bracket on opposite sides of said aperture means.

3. A cradle according to claim 2 further comprising means for equalizing moments applied to the opposite sides of said aperture means by said cylinder means.

4. A cradle according to claim 2 wherein said cylinder means have cylinder rods which are attached to said bracket and are equally spaced from said aperture means.

5. A cradle according to claim 2 wherein said cylinder means are operable by air pressure.

6. A cradle according to claim 5 further comprising valve means for adjusting air pressure to said cylinder means.

7. A cradle according to claim 2 wherein said mounting means comprises a single piece bracket having an aperture for receiving a body portion of the tool and a pair of apertures for receiving said cylinder means and further comprising means for adjusting diameters of said apertures to stabilize said single piece bracket on the tool and said cylinder means in said cylinder means apertures.

8. A cradle according to claim 1 wherein said mounting means comprises a single piece bracket having an aperture for receiving a body portion of the tool and means for adjusting the diameter of said aperture to stabilize said single piece bracket on the tool.

9. Hand-held apparatus for machining of cylinder head valve guide holes comprising a power tool including means for attaching thereto tooling having a pilot portion and receivable in a valve guide hole for machining thereof, collar means having passage means for the tooling and which has a shape to engage a least worn portion of a valve seat associated with the valve guide hole around a circumference thereof without engaging more worn portions of the valve seat, and means for holding said collar means in engagement with the valve seat during machining of the guide hole, said holding means comprising a bracket having aperture means sized for passage of the tooling without passing said collar means and with said bracket disposed between said tool and said collar means for bearing on said collar means, and means for applying force to said bracket to bear on said collar means to hold said collar means in engagement with the valve seat whereby to align, in combination with the tooling pilot portion, the tooling in the valve guide hole.

10. Apparatus according to claim 9 wherein said force applying means comprises at least two cylinder means connected to said bracket on opposite sides of said aperture means.

11. Apparatus according to claim 10 further comprising means for equalizing moments applied to the opposite sides of said aperture means by said cylinder means.

12. Apparatus according to claim 10 wherein said cylinder means have cylinder rods which are attached to said bracket and which are equally spaced from said aperture means.

13. Apparatus according to claim 10 wherein said cylinder means and said power tool are operable by air pressure.

14. Apparatus according to claim 13 further comprising means for adjusting air pressure to said cylinder means.

15. Apparatus according to claim 10 further comprising a single piece bracket having an aperture for receiving a body portion of said tool and a pair of apertures for receiving said cylinder means and further comprising means for adjusting diameters of said apertures to stabilize said single piece bracket on said tool and said cylinder means in said cylinder means apertures.

16. Apparatus according to claim 9 wherein said collar means includes a bushing which is slidable along length of said tooling, a collar member having said shape, and O-ring means effecting engagement between said collar member and said bushing for rapid interchangeability of said collar member.

17. Apparatus according to claim 9 further comprising tooling having a pilot portion and adapted to be received in a valve guide hole for machining thereof.

18. A method for aligning tooling having a pilot portion for machining of a cylinder head valve guide hole by a hand-held tool, the method comprising the steps of:
 a. applying to the tooling a collar which has a shape to engage a least worn portion of a valve seat associated with the value guide hole around a circumference thereof without engaging more worn portions of the valve seat;
 b. providing a bracket in a position to bear on the collar;
 c. inserting the tooling into the valve guide hole while operating the tool; and
 d. applying force to the bracket to hold the collar in engagement with the valve seat whereby to align, in combination with the tooling pilot portion, the tooling in the valve guide hole.

19. A method according to claim 18 wherein the step of applying force comprises providing at least two cylinders having cylinder rods and attaching the cylinder rods to the bracket at equal distances from the tooling.

20. A method according to claim 19 further comprising applying air pressure to the tool and to the cylinders for operation thereof.

* * * * *